US010102677B2

(12) United States Patent
Takahashi

(10) Patent No.: US 10,102,677 B2
(45) Date of Patent: Oct. 16, 2018

(54) COMPUTER-READABLE RECORDING MEDIUM FOR DRAWING PROCESSING, DRAWING PROCESSING APPARATUS, DRAWING PROCESSING METHOD, COMPUTER-READABLE RECORDING MEDIUM FOR SOUND PROCESSING, SOUND PROCESSING APPARATUS, AND SOUND PROCESSING METHOD

(71) Applicant: SQUARE ENIX CO., LTD., Tokyo (JP)

(72) Inventor: Hideyuki Takahashi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 34 days.

(21) Appl. No.: 15/355,537

(22) Filed: Nov. 18, 2016

(65) Prior Publication Data

US 2017/0148219 A1    May 25, 2017

(30) Foreign Application Priority Data

Nov. 20, 2015  (JP) ................................. 2015-228183

(51) Int. Cl.
*G06T 19/00*     (2011.01)
*G06T 15/04*     (2011.01)

(52) U.S. Cl.
CPC ............ *G06T 19/006* (2013.01); *G06T 15/04* (2013.01)

(58) Field of Classification Search
CPC ....... G06T 11/40; G06T 11/203; G06T 17/00; G06T 11/001; G06T 11/00
See application file for complete search history.

(56) References Cited

U.S. PATENT DOCUMENTS

| 4,865,423 A | 9/1989 | Doi |
| 5,597,844 A | 1/1997 | Chauhan et al. |
| 2006/0066611 A1* | 3/2006 | Fujiwara ................. G06T 15/06 345/419 |

FOREIGN PATENT DOCUMENTS

EP     0299769     1/1989

OTHER PUBLICATIONS

Extended European Search Report from European Patent Office (EPO) in European Patent Appl. No. 16199652.5, dated Mar. 7, 2017.

* cited by examiner

*Primary Examiner* — Todd Buttram
(74) *Attorney, Agent, or Firm* — Greenblum & Bernstein, P.L.C.

(57) ABSTRACT

A drawing processing program executed in a computer apparatus causes the computer apparatus to function as: a virtual box setter that sets plural rectangular parallelepiped virtual boxes in a predetermined region having a rectangular parallelepiped shape in a virtual space; an object placer that places an object having the same shape and size as those of each virtual box in at least a part of the plural virtual boxes; an influence degree setter that sets, before a straight line that extends from a light source intersects the placed object, a baseline influence degree which is a baseline with respect to a first virtual box that can be intersected and sets an influence degree of a second virtual box based on the baseline influence degree; and a drawing processor that executes a drawing process in the virtual space based on the set influence degree.

7 Claims, 13 Drawing Sheets

FIG. 6
(a)
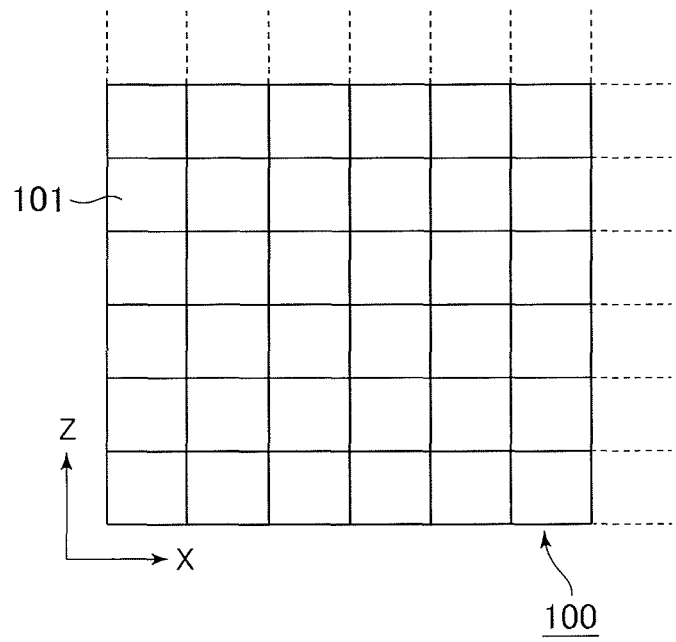
(b)
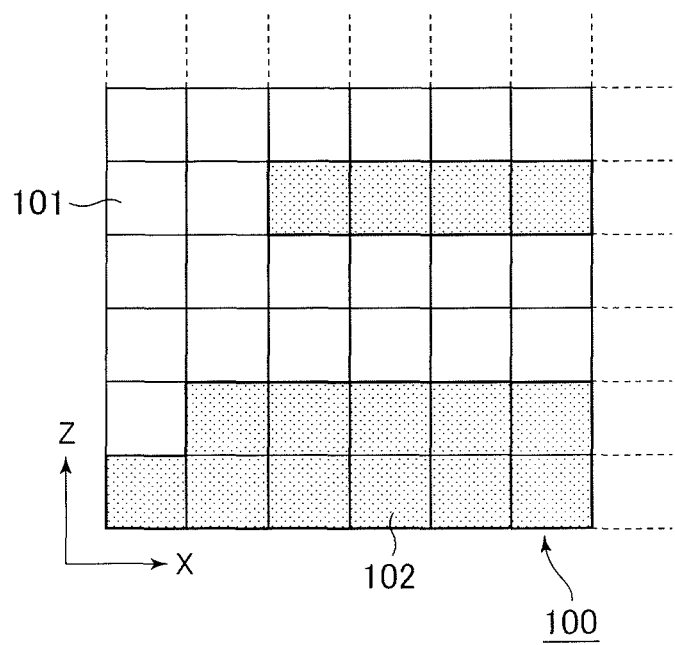

FIG. 8
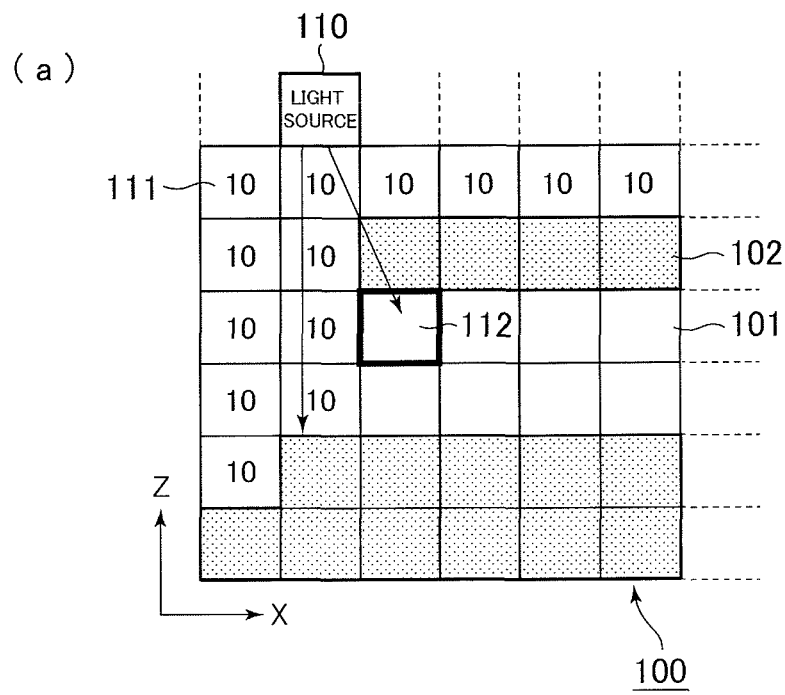
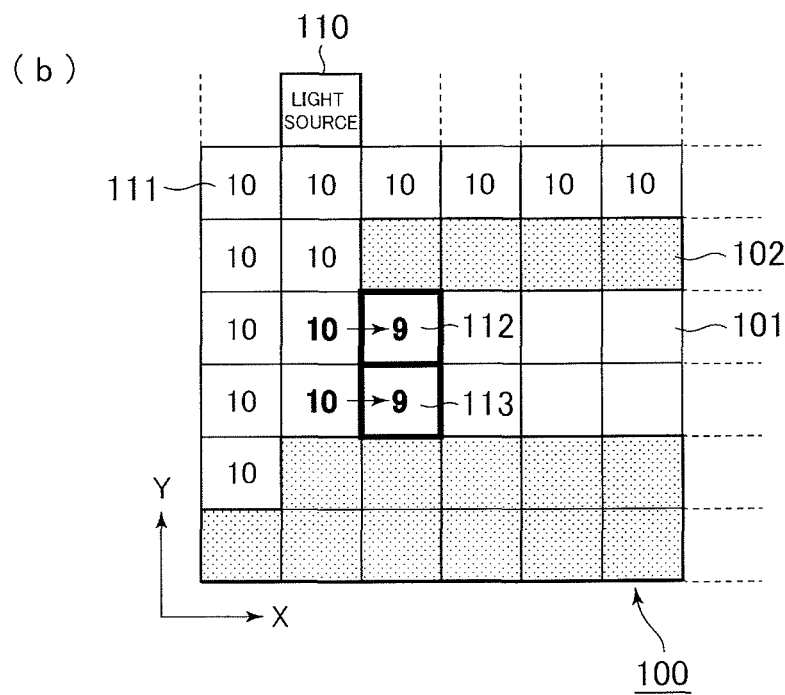

*FIG. 12*

OBJECT DISPLAY MODE MASTER

| OBJECT ATTRIBUTE | ADJACENT INFLUENCE DEGREE | TEXTURE |
|---|---|---|
| SOIL | 1 | CHOCOLATE |
| | 2 | REDDISH BROWN |
| | 3 | CHESTNUT COLOR |
| | 4 | COCOA BROWN |
| | 5 | BROWN |
| | 6 | BRICK RED |
| | 7 | REDDISH YELLOW |
| | 8 | LIGHT BROWN |
| | 9 | YELLOW BROWN |
| | 10 | TAN |
| WATER | 1 | DEEP INDIGO |
| | 2 | NAVY BLUE |
| | 3 | INDIGO |
| ... | ... | ... |

130

COMPUTER-READABLE RECORDING MEDIUM FOR DRAWING PROCESSING, DRAWING PROCESSING APPARATUS, DRAWING PROCESSING METHOD, COMPUTER-READABLE RECORDING MEDIUM FOR SOUND PROCESSING, SOUND PROCESSING APPARATUS, AND SOUND PROCESSING METHOD

CROSS REFERENCE TO RELATED APPLICATION

The present disclosure relates to subject matter contained in Japanese Patent Application No. 2015-228183, filed on Nov. 20, 2015, the disclosure of which is expressly incorporated herein by reference in its entirety.

BACKGROUND OF THE INVENTION

Field of the Invention

The present invention relates to a computer-readable recording medium for drawing processing, a drawing processing apparatus, a drawing processing method, a computer-readable recording medium for sound processing, a sound processing apparatus, and a sound processing method.

Description of Related Art

In the related art, a sandbox type game in which a player is able to move an object in a virtual space, to generate and place a new object, and to delete an object to freely build a building or change a terrain is known. Differently from many types of games in which a player character moves in a virtual space to progress in a game, in the sandbox type game, a virtual space is generally seamless without a screen stopping or darkening due to map switching or data downloading.

However, in a virtual space simulation, it is necessary to perform a complicated computational process with respect to graphics and sound. That is, it is necessary to execute a shading process of changing a color of an object based on a distance or an angle from a light source or a computational process relating to a manner in which sound is heard at a predetermined position based on a distance from a sound source or the presence or absence of an obstacle.

SUMMARY OF THE INVENTION

Technical Problem

However, for example, if a shading process is executed to reflect the influence of a light source from the outside with respect to expression of an object at a place, such as a building or a cave, that a light source such as sunlight does not directly reach, there is a problem in that a processing load increases.

Similarly, if a computational process for reflecting the influence from a sound source is executed with respect to simulation of a manner in which sound is heard at a predetermined position, there is a problem in that a processing load increases.

Further, in a case where an object expression method or a manner in which sound is heard is changed according to whether a place where a player character is positioned is indoors or outdoors, it is necessary to perform a more complicated shading process or computational process relating to sound, and thus, there is a problem in that a processing load increases.

An object of at least one of embodiments of the invention is to provide a computer-readable recording medium for drawing processing, a drawing processing apparatus, a drawing processing method, a computer-readable recording medium for sound processing, a sound processing apparatus, and a sound processing method capable of reducing a load relating to a simulation process in a virtual space.

Solution to Problem

According to a non-limiting aspect, a non-transitory computer-readable recording medium having recorded thereon a program which is executed in a computer apparatus that causes the computer apparatus to function as: an object placer that places a rectangular parallelepiped object having a given attribute and a display mode according to the given attribute in a virtual space; a first display mode identifier that identifies a display mode of a face of a placed object which is not in contact with a different placed object according to an attribute of the placed object; a second display mode identifier that identifies, with respect to at least one of a plurality of placed objects which are adjacent to each other and have different attributes, a display mode of a face thereof which is not in contact with a different placed object according to an attribute of the placed object and an attribute of an adjacent placed object; and a drawer that performs drawing for displaying a placed object on a display screen, according to a display mode identified by the first display mode identifier and a display mode identified by the second display mode identifier, wherein the second display mode identifier preferentially performs execution with respect to the first display mode identifier.

According to a non-limiting aspect, a drawing processing apparatus including: a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space; an object placer that places an object having the same shape and size as those of each virtual box so as to overlap the shape of the virtual box in at least a part of the plurality of virtual boxes; an influence degree setter that sets, before a straight line that extends from a light source intersects the placed object, a baseline influence degree which is a baseline as an influence degree due to the light source with respect to a first virtual box that can be intersected by the straight line, and sets an influence degree of a second virtual box other than the first virtual box based on the baseline influence degree set with respect to the first virtual box; and a drawing processor that executes a drawing process in the virtual space based on the set influence degree.

According to a non-limiting aspect, a drawing processing method executed in a computer apparatus, including: a step of setting a plurality of rectangular parallelepiped virtual boxes that have the same shapes and sizes and are respectively aligned in three axial directions orthogonal to each other, in a predetermined region having at least a rectangular parallelepiped shape in a virtual space; a step of placing an object having the same shape and size as those of each virtual box so as to overlap the shape of the virtual box in at least a part of the plurality of virtual boxes; a step of setting, before a straight line that extends from a light source intersects the placed object, a baseline influence degree which is a baseline as an influence degree due to the light source with respect to a first virtual box that can be intersected by the straight line, and setting an influence degree of a second virtual box other than the first virtual box based on the baseline influence degree set with respect to the first virtual box; and a step of executing a drawing process in the virtual space based on the set influence degree.

According to a non-limiting aspect, a non-transitory computer-readable recording medium having recorded thereon a sound processing program which is executed in a computer apparatus that causes the computer apparatus to function as: a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space; an object placer that places an object having the same shape and size as those of each virtual box so as to overlap the shape of the virtual box in at least a part of the plurality of virtual boxes; an influence degree setter that sets, before a straight line that extends from a sound source intersects the placed object, an influence degree due to the sound source with respect to a first virtual box that can be intersected by the straight line, and sets an influence degree of a virtual box other than the first virtual box based on the influence degree set with respect to the first virtual box; and a sound processor that executes a sound processing process relating to the sound source based on the set influence degree.

According to a non-limiting aspect, a sound processing apparatus including: a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space; an object placer that places an object having the same shape and size as those of each virtual box so as to overlap the shape of the virtual box in at least a part of the plurality of virtual boxes; an influence degree setter that sets, before a straight line that extends from a sound source intersects the placed object, an influence degree due to the sound source with respect to a first virtual box that can be intersected by the straight line, and sets an influence degree of a virtual box other than the first virtual box based on the influence degree set with respect to the first virtual box; and a sound processor that executes a sound processing process relating to the sound source based on the set influence degree.

According to a non-limiting aspect, a sound processing method executed in a computer apparatus, including: a step of setting a plurality of rectangular parallelepiped virtual boxes that have the same shapes and sizes and are respectively aligned in three axial directions orthogonal to each other, in a predetermined region having at least a rectangular parallelepiped shape in a virtual space; a step of placing an object having the same shape and size as those of each virtual box so as to overlap the shape of the virtual box in at least a part of the plurality of virtual boxes; a step of setting, before a straight line that extends from a sound source intersects the placed object, an influence degree due to the sound source with respect to a first virtual box that can be intersected by the straight line, and setting an influence degree of a virtual box other than the first virtual box based on the influence degree set with respect to the first virtual box; and a step of executing a sound processing process relating to the sound source based on the set influence degree.

According to a non-limiting aspect, a non-transitory computer-readable recording medium having recorded thereon a sound processing program which is executed in a computer apparatus that causes the computer apparatus to function as: a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space; an object placer that places an object having the same shape and size as those of each virtual box so as to overlap the shape of the virtual box in at least a part of the plurality of virtual boxes; an indoors degree setter that sets, before a straight line that extends from a predetermined point in the virtual space intersects the placed object, an indoors degree indicating the degree of whether a space formed by the placed object is indoors or outdoors with respect to a first virtual box that can be intersected by the straight line, and sets an indoors degree of a virtual box other than the first virtual box based on the indoors degree set with respect to the first virtual box; and a processor that executes a sound processing process relating to a predetermined sound source or an operation process of a predetermined object in the virtual space based on the set indoors degree.

According to a non-limiting aspect, a sound processing apparatus including: a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space; an object placer that places an object having the same shape and size as those of each virtual box so as to overlap the shape of the virtual box in at least a part of the plurality of virtual boxes; an indoors degree setter that sets, before a straight line that extends from a predetermined point in the virtual space intersects the placed object, an indoors degree indicating the degree of whether a space formed by the placed object is indoors or outdoors with respect to a first virtual box that can be intersected by the straight line, and sets an indoors degree of a virtual box other than the first virtual box based on the indoors degree set with respect to the first virtual box; and a processor that executes a sound processing process relating to a predetermined sound source or an operation process of a predetermined object in the virtual space based on the set indoors degree.

According to a non-limiting aspect, a sound processing method executed in a computer apparatus, including: a step of setting a plurality of rectangular parallelepiped virtual boxes that have the same shapes and sizes and are respectively aligned in three axial directions orthogonal to each other, in a predetermined region having at least a rectangular parallelepiped shape in a virtual space; a step of placing an object having the same shape and size as those of each virtual box so as to overlap the shape of the virtual box in at least a part of the plurality of virtual boxes; a step of setting, before a straight line that extends from a predetermined point in the virtual space intersects the placed object, an indoors degree indicating the degree of whether a space formed by the placed object is indoors or outdoors with respect to a first virtual box that can be intersected by the straight line, and setting an indoors degree of a virtual box other than the first virtual box based on the indoors degree set with respect to the first virtual box; and a step of executing a sound processing process relating to a predetermined sound source or an operation process of a predetermined object in the virtual space based on the set indoors degree.

Advantageous Effects of Invention

One or more of the above problems can be solved with each embodiment of the present invention.

BRIEF DESCRIPTION OF THE DRAWINGS

FIG. 6 is a diagram showing setting of virtual boxes and placement of objects corresponding to at least one of embodiments of the invention.

FIG. 8 is a diagram showing setting of an influence degree corresponding to at least one of embodiments of the invention.

FIG. 12 is a diagram showing an object display mode master table corresponding to at least one of embodiments of the invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

Figure 1:
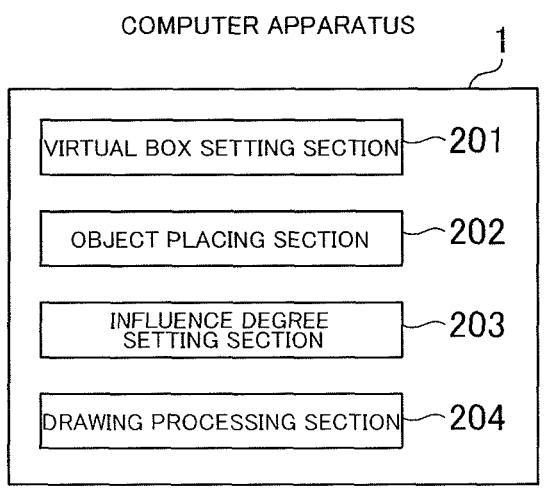
FIG. 1 is a block diagram showing a configuration of a computer apparatus corresponding to at least one of embodiments of the invention.

An outline of a first embodiment of the invention will be described. FIG. 1 is a block diagram showing a configuration of a computer apparatus corresponding to at least one of embodiments of the invention. A computer apparatus 1 includes at least a virtual box setting section 201, an object placing section 202, an influence degree setting section 203, and a drawing processing section 204.

The virtual box setting section 201 has a function of setting plural rectangular parallelepiped virtual boxes that have the same shapes and sizes and are respectively aligned in three axial directions orthogonal to each other, in a predetermined region having at least a rectangular parallelepiped shape in a virtual space. The object placing section 202 has a function of placing an object having the same shape and size as those of the virtual box so as to overlap the shape of the virtual box in at least a part of the plural virtual boxes.

The influence degree setting section 203 has a function of setting, before a straight line that extends from a light source intersects a placed object, a baseline influence degree which is a baseline as an influence degree due to the light source with respect to a first virtual box that can be intersected by the straight line, and setting an influence degree of a second virtual box other than the first virtual box based on the baseline influence degree set with respect to the first virtual box. The drawing processing section 204 has a function of executing a drawing process in the virtual space based on the set influence degree.

Figure 2:
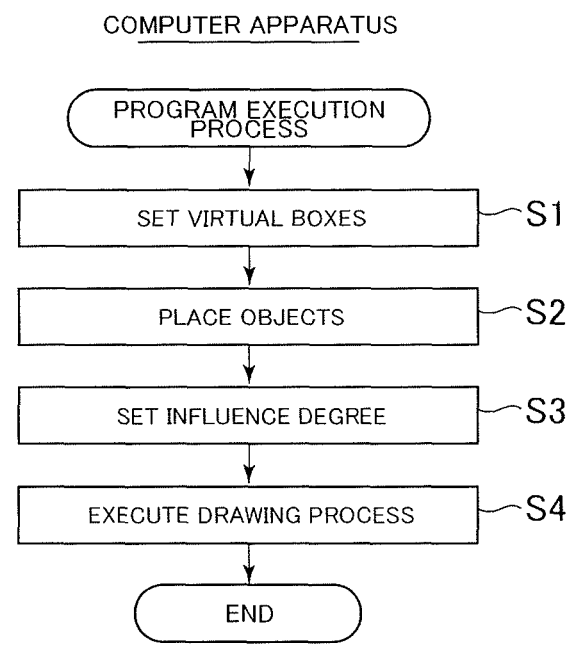
FIG. 2 is a flowchart of a program execution process corresponding to at least one of embodiments of the invention.

A program execution process in the first embodiment of the invention will be described. FIG. 2 is a flowchart of a program execution process corresponding to at least one of embodiments of the invention.

The computer apparatus 1 sets plural rectangular parallelepiped virtual boxes that have the same shapes and sizes and are respectively aligned in three axial directions orthogonal to each other, in a predetermined region having at least a rectangular parallelepiped shape in a virtual space (step S1). The computer apparatus 1 places an object having the same shape and size as those of the virtual box so as to overlap the shape of the virtual box in at least a part of the set plural virtual boxes (step S2).

Before a straight line that extends from a light source intersects a placed object, a baseline influence degree which is a baseline as an influence degree due to the light source is set with respect to a first virtual box that can be intersected by the straight line, and an influence degree of a second virtual box other than the first virtual box is set based on the baseline influence degree set with respect to the first virtual box (step S3). A drawing process in the virtual space is executed based on the set influence degrees (step S4), and then, the procedure is terminated.

As an aspect of the first embodiment, by setting an influence degree with respect to a virtual box and performing a drawing process based on the set influence degree, it is possible to reduce a load relating to a simulation process in a virtual space.

In the first embodiment, the "computer apparatus" refers to a desk-top computer or a notebook type personal computer, a tablet computer, a PDA, or the like, and may be a mobile terminal of which a display screen includes a touch panel sensor, for example. The "drawing" refers to drawing an object or the like in a virtual space through a rendering process, for example.

The "virtual space" refers to a virtual space on a computer, for example. The "light source" refers to a unit that emits or radiates light, for example, and is a concept including one of an infinitely distant light source such as the sun and a point light source such as fire or light. The "object" refers to a tangible object in a virtual space, for example.

The "virtual boxes" refer to plural rectangular parallelepiped boxes that have the same shapes and sizes and are respectively aligned in three axial directions orthogonal to each other, divided from a virtual space. The "first virtual box" refers to a virtual box that can be intersected, before a straight line that extends from a light source intersects a placed object, by the straight line, for example. The "second virtual box" refers to a virtual box other than the first virtual box, for example.

Second Embodiment

Next, an outline of a second embodiment of the invention will be described. A configuration of a computer apparatus in the second embodiment may adopt the same configuration as that shown in the block diagram of FIG. 1.

Figure 3:
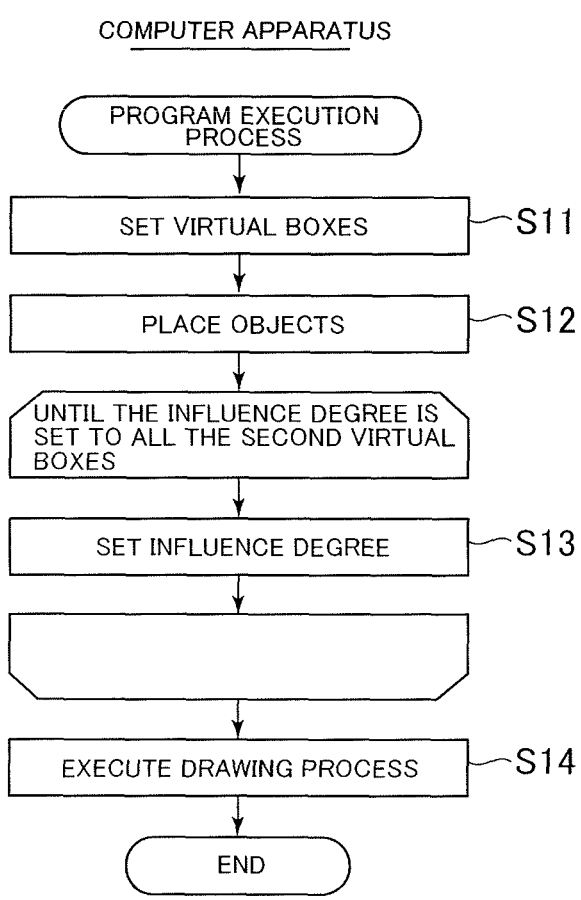
FIG. 3 is a flowchart of a program execution process corresponding to at least one of embodiments of the invention.

A program execution process in the second embodiment of the invention will be described. FIG. 3 is a flowchart of a program execution process corresponding to at least one of embodiments of the invention.

A computer apparatus 1 sets plural rectangular parallelepiped virtual boxes that have the same shapes and sizes and are respectively aligned in three axial directions orthogonal to each other, in a predetermined region having at least a rectangular parallelepiped shape in a virtual space (step S11). The computer apparatus 1 places an object having the same shape and size as those of the virtual box so as to overlap the shape of the virtual box in at least a part of the set plural virtual boxes (step S12).

Before a straight line that extends from a light source intersects a placed object, a baseline influence degree which is a baseline as an influence degree due to the light source is set with respect to a first virtual box that can be intersected by the straight line, and an influence degree of a second virtual box other than the first virtual box is set based on the baseline influence degree set with respect to the first virtual box. Further, an influence degree due to the light source is set with respect to a second virtual box for which an influence degree is not yet set, which is adjacent to the second virtual box for which an influence degree is set, based on the influence degree set with respect to the second virtual box (step S13).

Further, setting of an influence degree with respect to a second virtual box for which an influence degree is not yet set, which is adjacent to a second virtual box for which an influence degree is set, is repeatedly executed until the influence degree is set with respect to all the second virtual boxes. Further, according to the influence degrees set with respect to the virtual boxes, a drawing process in the virtual space is executed (step S15), and then, the procedure is terminated.

As an aspect of the second embodiment, by repeatedly executing setting of an influence degree with respect to a second virtual box for which an influence degree is not yet set, which is adjacent to a second virtual box for which an influence degree is set, and by performing a drawing process based on the set influence degrees, it is possible to reduce a load relating to a simulation process in a virtual space.

In the second embodiment, the "computer apparatus", "drawing", the "virtual space", the "light source", the "object", the "first virtual box", and the "second virtual box" are the same as the contents disclosed in the first embodiment, respectively.

Third Embodiment

Next, an outline of a third embodiment of the invention will be described. A configuration of a computer apparatus according to the third embodiment may adopt the same configuration as that shown in the block diagram of FIG. 1. Further, a flow of a program execution process in the third embodiment may adopt the same configuration as that shown in the flowchart of FIG. 3.

As an aspect of the third embodiment, in a case where different influence degrees with respect to the same virtual box are calculated, by setting a value closer to a baseline influence degree as an influence degree, it is possible to express more realistic and higher quality graphics.

In the third embodiment, the "computer apparatus", the "drawing", the "virtual space", the "light source", the "object", the "first virtual box", and the "second virtual box" are the same as the contents disclosed in the first embodiment, respectively.

Fourth Embodiment

Figure 4:
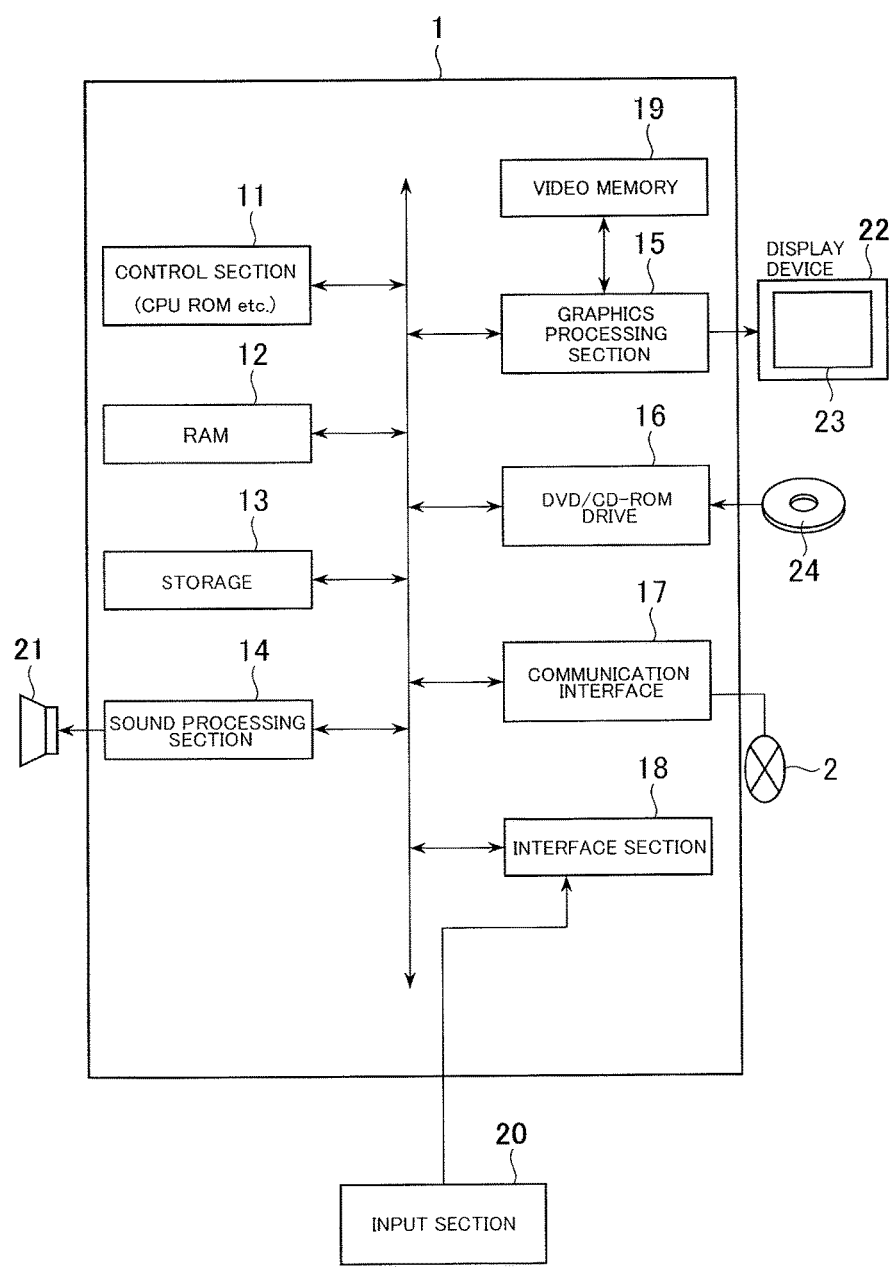
FIG. 4 is a block diagram showing a configuration of a computer apparatus corresponding to at least one of embodiments of the invention.

Next, an outline of a fourth embodiment of the invention will be described. FIG. 4 is a block diagram showing a configuration of a computer apparatus corresponding to at least one of embodiments of the invention. A computer apparatus 1 includes at least a control section 11, a RAM (random access memory) 12, a storage 13, a sound processing section 14, a graphics processing section 15, a DVD/CD-ROM drive 16, a communication interface 17, and an interface section 18, which are connected to each other through an internal bus.

The control section 11 includes a central processing unit (CPU) and a ROM (read only memory). The control section 11 executes a program stored in the storage 13 or a recording medium 24 to control the computer apparatus 1. Further, the control section 11 includes an internal timer that clocks time. The RAM 12 is a work area of the control section 11. The storage 13 is a storage area for storing a program or data.

The DVD/CD-ROM drive 16 is a unit on which the recording medium 24 in which a program such as a DVD-ROM or a CD-ROM is stored can be mounted. For example, a program and data are stored in the recording medium 24. The program and data are read from the recording medium 24 by the DVD/CD-ROM drive 16, and are loaded into the RAM 12.

The control section 11 reads the program and data from the RAM 12 and performs a process. The control section 11 processes the program and data loaded in the RAM 12 to output a sound output instruction to the sound processing section 14, and to output a drawing command to the graphics processing section 15.

The sound processing section 14 is connected to a sound output device 21 which is a speaker. If the control section 11 outputs a sound output instruction to the sound processing section 14, the sound processing section 14 outputs a sound signal to the sound output device 21.

The graphics processing section 15 is connected to a display device 22. The display device 22 includes a display screen 23. If the control section 11 outputs a drawing command to the graphics processing section 15, the graphics processing section 15 develops an image into a video memory (frame buffer) 19, and outputs a video signal for displaying the image on the display screen 23. The graphics processing section 15 executes drawing for one image in the unit of frames. One frame time of the image is $1/30$ seconds, for example. The graphics processing section 15 has a function of receiving a part of a computational process relating to the drawing performed only by the control section 11 to disperse a load of an entire system.

The input section 20 (for example, a mouse, a keyboard, or the like) may be connected to the interface section 18. Information input through the input section 20 from a user is stored in the RAM 12, and the control section 11 executes a variety of computational processes based on the input information. Alternatively, a configuration in which a storage medium reading device is connected to the interface section 18 and a program, data or the like is read from a memory or the like may be used. Further, the display device 22 that includes a touch panel may be used as the input section 20.

The communication interface 17 may be connected to a communication network 2 in a wireless or wired manner, and may perform transmission and reception of information with other computer apparatuses through the communication network 2.

Figure 5:
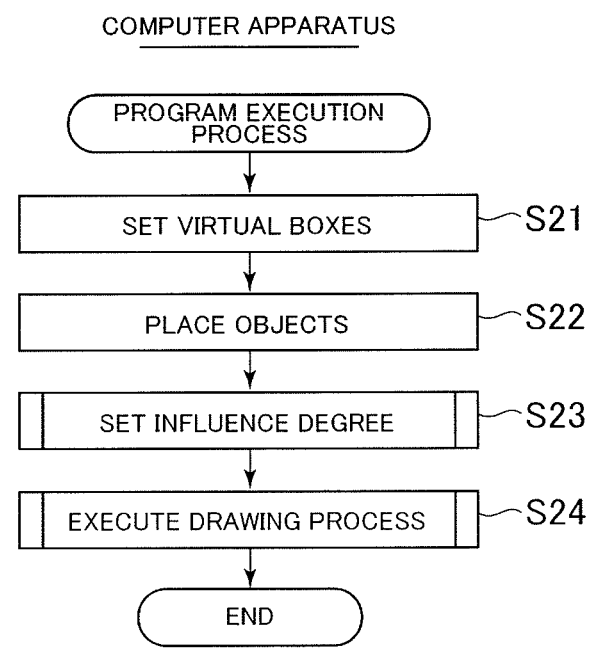
FIG. 5 is a flowchart of a program execution process corresponding to at least one of embodiments of the invention.

Next, a program execution process in a fourth embodiment of the invention will be described. FIG. 5 is a flowchart of a program execution process corresponding to at least one of embodiments of the invention. In the fourth embodiment of the invention, for example, a program for placing an object in a virtual space having a light source and drawing a virtual world may be used.

First, plural rectangular parallelepiped (preferably, cubic) virtual boxes that have the same shapes and sizes and are respectively aligned in three axial directions orthogonal to each other are set in a predetermined region having a rectangular parallelepiped shape in a virtual space (step S21). The predetermined region having the rectangular parallelepiped shape in the virtual space which is a virtual box setting target may be a part of the virtual space, or may be the entirety of the virtual space. It is preferable that the virtual box setting region is set to include all targets for which a drawing process to be described later is to be performed.

Next, an object having the same shape and size as those of a virtual box is placed in at least a part of plural virtual boxes to overlap the shape of the virtual box (step S22). In the placement of the object, an object of a predetermined type may be placed at a predetermined position according to a predetermined program, or an arbitrary object may be placed at an arbitrary position according to a player's operation. The object may have at least one or more attributes. For example, as an attribute of the object, a material such as "grass", "soil", "water", "rock", or the like may be used. A display mode of the object varies for each object attribute.

Setting of virtual boxes and placement of objects will be described with reference to the accompanying drawings. FIGS. 6A and 6B are diagrams showing setting of virtual boxes and placement of objects corresponding to at least one of embodiments of the invention.

FIG. 6A is a diagram schematically showing a three-dimensional virtual space after setting virtual boxes in step S21. For example, in a case where a virtual space is managed using an orthogonal coordinate system, in which an X axis and a Y axis are set in parallel with a horizontal plane, a Z axis is set in a height direction to be orthogonal to the X axis and the Y axis, the virtual space is seen on an X-Z plane in a planar view. In the figure, a longitudinal direction corresponds to the height direction of the virtual space. In a predetermined region 100 in the virtual space (indicated by broken lines), plural virtual boxes 101 (indicated by solid lines) are set. A part of the virtual space may be the predetermined region 100 as shown in the figure, or the entirety of the virtual space may be the same as the predetermined region 100.

FIG. 6B shows a state after placement of objects in step S22, in which objects are placed in the virtual space shown in FIG. 6A. Plural objects 102 (indicated by half-tone dot meshing) having the same shape and size as those of the virtual box 101 are placed. Each object may be placed corresponding to any box among the virtual boxes.

Subsequently, returning to the flowchart of FIG. 5, an influence degree setting process of setting an influence degree due to the light source provided in the virtual space is performed with respect to virtual boxes where objects are not placed among the virtual boxes set in step S21, according to the objects placed in step S22 (step S23).

Figure 7:
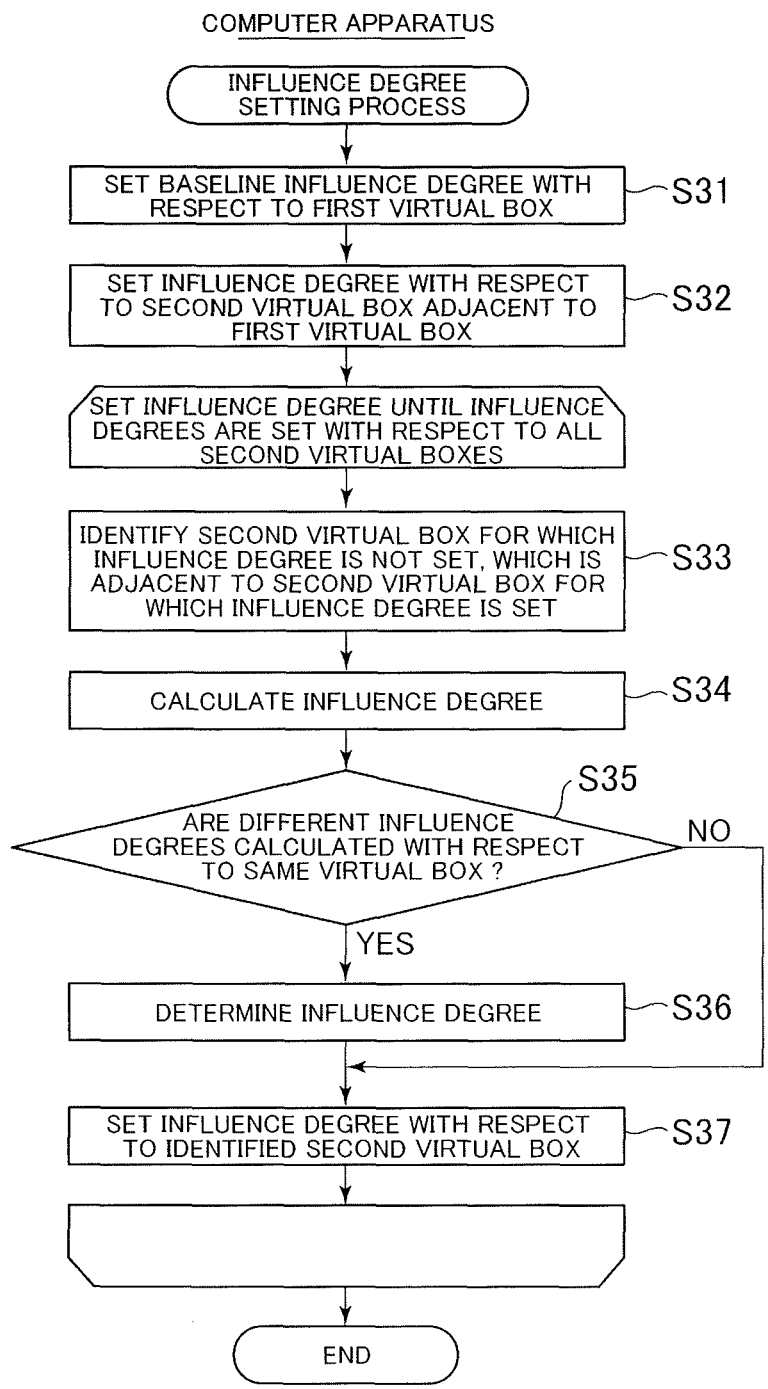
FIG. 7 is a flowchart of an influence degree setting process corresponding to at least one of embodiments of the invention.

The influence degree setting process will be described with reference to the accompanying drawing. FIG. 7 is a flowchart of an influence degree setting process corresponding to at least one of embodiments of the invention.

First, before a straight line (light beam) that extends from a light source (which may be an infinitely distant light source or a point light source) set in a virtual space intersects an object placed in step S22, a baseline influence degree which is a baseline as an influence degree due to the light source is set with respect to a first virtual box that can be intersected by the straight line (step S31). Subsequently, an influence degree of a second virtual box which is a virtual box other than the first virtual box, in which an object is not placed, is set based on the baseline influence degree set with respect to the first virtual box (step S32).

Setting of the baseline influence degree of the first virtual box and the influence degree of the second virtual box adjacent to the first virtual box will be described with reference to the accompanying drawings. FIGS. 8A and 8B are diagrams showing setting of an influence degree corresponding to at least one of embodiments of the invention.

FIG. 8A is a diagram showing setting of the baseline influence degree with respect to the first virtual box. In a predetermined region 100 of a virtual space, in a case where a light source 110 is set at a shown position, a baseline influence degree which is a baseline as an influence degree is set with respect to a virtual box which is reached by a straight line from a light source (light beam). In the figure, a numerical value written in a frame indicating a virtual box represents an influence degree, in which a baseline influence degree is set to "10", for example. Virtual boxes 111 where "10" is written in the frames are all the first virtual boxes.

On the other hand, since the second virtual box 112 is disposed at a position which is not directly reached by light from the light source due to the object 102, the baseline influence degree is not set with respect to the second virtual box 112. In this way, the first virtual boxes for which the baseline influence degree is set in step S31 and the second virtual boxes for which the influence degree is not set are distinguished from each other.

Then, FIG. 8B is a diagram showing setting of an influence degree with respect to a second virtual box adjacent to a first virtual box. In FIG. 8A, with respect to second virtual boxes 112 and 113 for which influence degrees are not yet set, which are adjacent to the first virtual boxes 111 for which the baseline influence degree is set, the influence degrees are set based on the baseline influence degree set with respect to the first virtual boxes.

Here, in the setting of the influence degrees, the influence degree may have arbitrary values which are smaller (or larger) than the baseline influence degree, and it is preferable that the influence degrees decrease (or increase) according to distances for more natural drawing.

For example, in a case where the baseline influence degree of the first virtual box is "10", an influence degree obtained by subtracting "1" which is a predetermined value therefrom may be set with respect to a second virtual box adjacent to the first virtual box. In this way, an influence degree of "9" is set with respect to the second virtual boxes 112 and 113 adjacent to the first virtual boxes. The predetermined value used for the subtraction may be set according to a situation of the virtual space. For example, if it is fine, "1" may be used, if it is rainy, "2" may be used, and if it is foggy, "5" may be used.

Subsequently, returning to FIG. 7, setting of influence degrees of all the second virtual boxes is performed. First, a second virtual box for which an influence degree is not set, which is adjacent to a second virtual box for which an influence degree is set, is identified (step S33). The influence degree to be set with respect to the identified second virtual box is calculated (step S34).

In the calculation method, similar to the setting of the influence degree with respect to the virtual box adjacent to the first box, it is preferable that the influence degree has a value smaller than the influence degree of the second virtual box for which the influence degree (or a value larger than the baseline influence degree) is set. For example, although not shown, influence degrees for second virtual boxes for which the influence degrees are not yet set (virtual boxes adjacent on the right side of the second virtual boxes 112 and 113), which are adjacent to the second virtual boxes 112 and 113 for which the influence degrees are set in FIG. 8B, may be set to "8" obtained by subtracting "1" which is a predetermined value from the set influence degrees "9" of the second virtual boxes.

In a case where the influence degrees are calculated according to distances, the distances may be calculated by any technique among the Manhattan distance or the Euclidean distance.

However, as described above, the calculation of the influence degrees of the second virtual boxes is performed using two methods. One is a method for calculating an influence degree of a second virtual box which is adjacent to a first virtual box based on the baseline influence degree of the first virtual box. The other one is a method for calculating an influence degree of a second virtual box for which the influence degree is not yet set, which is adjacent to the second virtual box for which the influence degree is set, based on the set influence degree of the second virtual box.

There is a case where influence degrees capable of being set are different from each other according to the methods for calculating the influence degrees of the second virtual boxes. The case where the influence degrees of the second virtual boxes are different from each other according to the calculation methods will be described with reference to the accompanying drawing.

Figure 9:
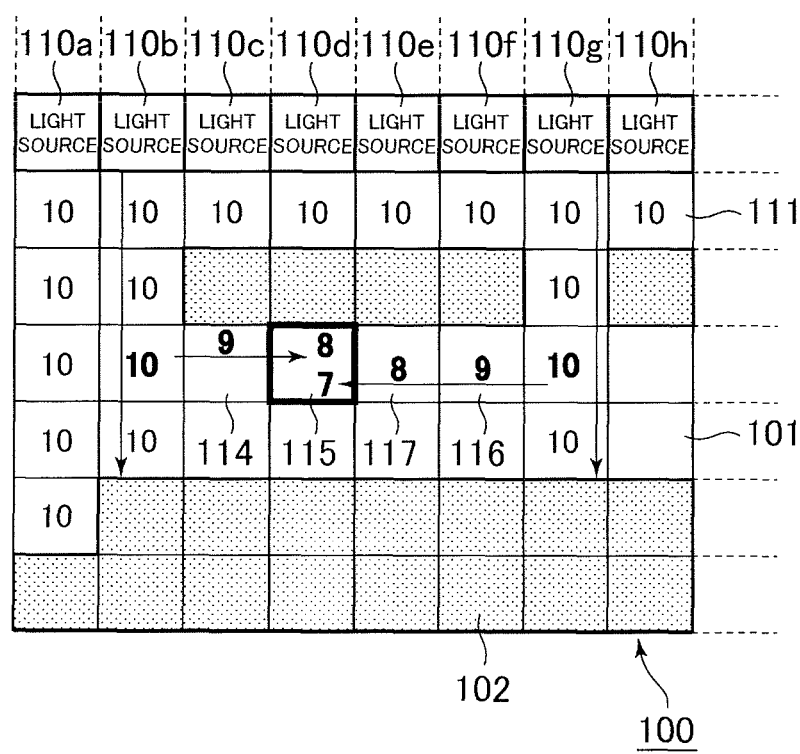
FIG. 9 is a diagram relating to a method for setting an influence degree for a second virtual box corresponding to at least one of embodiments of the invention.

FIG. 9 is a diagram relating to a method for setting an influence degree for a second virtual box corresponding to at least one of embodiments of the invention. In a predetermined region 100 of a virtual space, in a case where a so-called ambient light that equivalently irradiates light to an entire predetermined region is used as a light source 110, a baseline influence degree is set with respect to first virtual boxes 111. For example, the baseline influence degree is "10", and virtual boxes where "10" is written in frames in the figure are all the first virtual boxes.

Then, an influence degree of a second virtual box 114 is set based on the baseline influence degree of a first virtual box set by a light source 110b. In the figure, as the influence degree of the second virtual box 114, "9" obtained by subtracting "1" from the influence degree of the first virtual box is set. Further, an influence degree of a second virtual box 115 may be set based on the influence degree of the second virtual box 114. In the figure, as the influence degree of the second virtual box 115, "8" obtained by subtracting "1" from the influence degree of the second virtual box 114 may be set.

On the other hand, an influence degree of a second virtual box 116 is set based on a baseline influence degree of a first virtual box set by a light source 110g. In the figure, "9" is set as an embodiment. Further, an influence degree of a second virtual box 117 is set based on the influence degree of the second virtual box 116. In the figure, for example, "8" may be set. Further, the influence degree of the second virtual box 115 may be set based on the influence degree set with respect to the second virtual box 117. In the figure, for example, "7" may be set.

In this way, in a case where different influence degrees are calculated with respect to the same second virtual box 115, a value closer to the baseline influence degree may be set as an influence degree. In the case of the above-described embodiment, "8" which is a value closer to the baseline influence degree "10" is set as the influence degree of the second virtual box 115.

In the flowchart of FIG. 7, after the influence degrees of the second virtual boxes are calculated in step S34, it is determined whether different influence degrees are calculated with respect to the same virtual box (step S35). In a case where it is determined that different influence degrees are calculated with respect to the same virtual box (YES in step S35), it is determined which influence degree is to be set (step S36).

With respect to the second virtual boxes identified in step S33, the influence degree determined in step S36 is set in a case where different influence degrees are calculated with respect to the same virtual box (YES in step S35), and the influence degree calculated in step S34 is set in a case where different influence degrees are not calculated with respect to the same virtual box (NO in step S35) (step S37). Then, a second virtual box for which an influence degree is not yet set is identified, and until influence degrees are set with respect to all the second virtual boxes, the processes from step S33 to step S37 are repeatedly executed.

Figure 10:
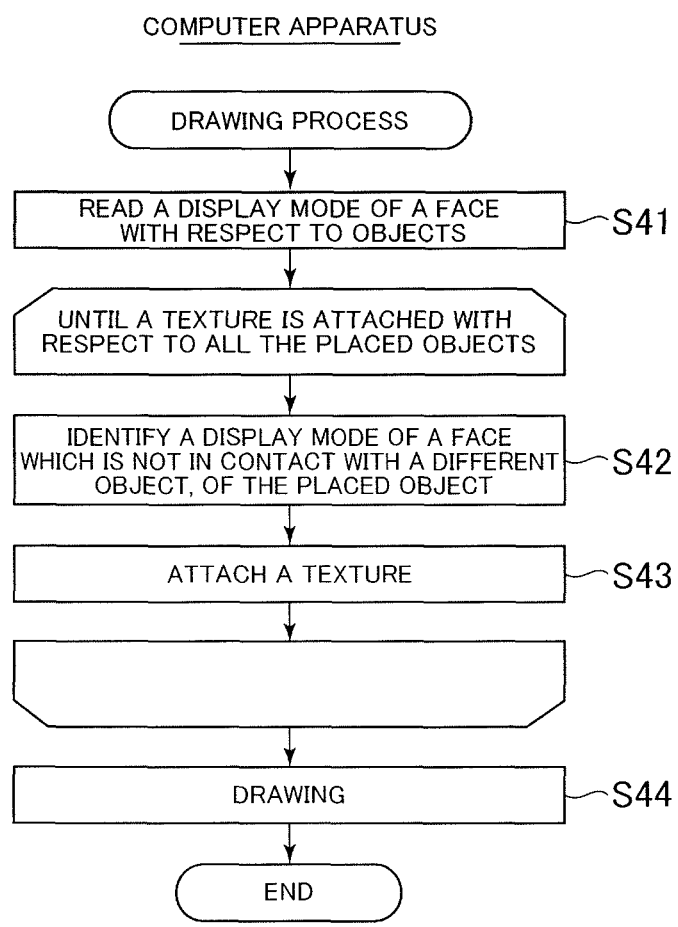
FIG. 10 is a flowchart of a drawing process corresponding to at least one of embodiments of the invention.

Next, returning to the flowchart of FIG. 5, the drawing process is executed (step S24). The drawing process will be described with reference to the accompanying drawing. FIG. 10 is a flowchart of a drawing process corresponding to at least one of embodiments of the invention.

First, a texture which is stored in association with an influence degree of a virtual box and represents a display mode of a face which is not in contact with a different object is read from the storage 13 of the computer apparatus 1 (step S41).

Figure 11:
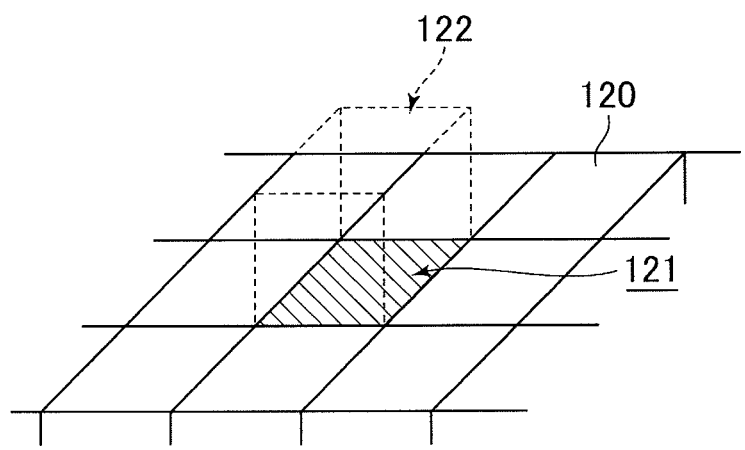
FIG. 11 is a diagram relating to an object having a face for which a drawing process is necessary corresponding to at least one of embodiments of the invention.

With respect to a placed object, a display mode of a face which is not in contact with a different object is identified (step S42). An object having a face for which the drawing process is necessary will be described with reference to the accompanying drawing. FIG. 11 is a diagram relating to an object having a face for which a drawing process is necessary corresponding to at least one of embodiments of the invention.

In a case where placed objects 120 are placed in a planar shape, a flat face 121 of each object is a face which is not in contact with a different object. As shown in the figure, the object 120 is adjacent to a virtual box 122, and the object 120 and the virtual box 122 share the flat face 121. By identifying a texture according to an influence degree (hereinafter, referred to as an adjacent influence degree) set with respect to the virtual box 122 which is adjacent to the object 120 and shares the flat face 121 which is not in contact with a different object, among plural textures read in step S41, the display mode of the objects is identified.

Subsequently, the identification of the texture will be described with reference to the accompanying drawing. FIG. 12 is a diagram showing an object display mode master table corresponding to at least one of embodiments of the invention. A texture 133 is stored in association with an object attribute 131 and an adjacent influence degree 132 in an object display mode master 130.

Information corresponding to an attribute of an object which is a target to which a texture is to be attached is registered in the object attribute 131. Information corresponding to an influence degree of an adjacent virtual box is registered in the adjacent influence degree 132. Information relating to a texture to be attached to an identified object is registered in the texture 133.

The registered information relating to the texture refers to information relating to a path to a texture file to which a name relating to the type of the texture is given. The texture file is stored in the storage 13 of the computer apparatus 1.

As an influence degree becomes a value more different from a baseline influence degree, the texture 133 may have a mode more different from a texture corresponding to the baseline influence degree. For example, as in the information registered in the object display mode master 130, as the influence degree becomes a value more different from the baseline influence degree "10", the texture may be stored to become a texture which is closer to black and has a darker tone.

For example, in a case where the object attribute 131 is "soil" and the adjacent influence degree 132 is "10", the texture 133 is "Tan", which is a light brown. On the other hand, in a case where the adjacent influence degree 132 is "1", the texture 133 is "chocolate", which is a dark brown. By providing different modes according to influence degrees in this way, it is possible to achieve a more natural color scheme by a simple process, to thereby reduce a processing load.

Subsequently, a texture is attached to an object using the texture which is the display mode of the object identified in step S42 (step S43). Until a texture is attached to a face which is not in contact with a different object with respect to all the placed objects, the processes of steps S42 and S43 are repeatedly executed. After the processes of steps S42 and S43 are terminated, a drawing process is executed with respect to an image which is generated through perspective transformation in the virtual space in the graphics processing section 15 (step S44).

In the fourth embodiment, the above-described influence setting method is exemplary, and an algorithm used for calculation of the influence degrees of the second virtual boxes is not limited. For example, an A* (A-star) algorithm may be used, or other graph search algorithms may be used.

In the fourth embodiment, the light source is not limited to one point, and as shown in FIG. 9, the entirety of an upper side may be occupied by light sources. In a case where natural light such as sunlight is expressed, more natural drawing can be achieved.

In the fourth embodiment, the above-described method may be applied to a simulation in a virtual space. Particularly, the method is useful in a case where it is necessary to perform a process in real time and in a seamless manner, in a game in which objects can be freely placed or removed according to a player's operation instruction, such as a sandbox type game.

As an aspect of the fourth embodiment, with respect to a placed object, by identifying a display mode of a face which is not in contact with a different object according to an influence degree of a virtual box set at a position that is in contact with the face which is not in contact with the different object, and by executing a drawing process in a virtual space according to the identified display mode of the object, it is possible to reduce a load relating to a simulation process in the virtual space.

As an aspect of the fourth embodiment, by attaching a texture having a mode more different from a texture corresponding to a baseline influence degree as an influence degree becomes a value more different from the baseline influence degree, it is possible to perform more realistic expression without performing a shading process, and thus, it is possible to reduce the load relating to the simulation process in the virtual space.

In the fourth embodiment, the "computer apparatus", the "drawing", the "virtual space", the "light source", the "object", the "first virtual box", and the "second virtual box" are the same as the contents disclosed in the first embodiment, respectively.

In the fourth embodiment, the "texture" refers to an image which is attached so as to express a texture of a face of an object in three-dimensional computer graphics, for example. The "object attribute" refers to an attribute or characteristic that belongs to a certain object, which represents an attribute or characteristic of an object.

Fifth Embodiment

Figure 13:
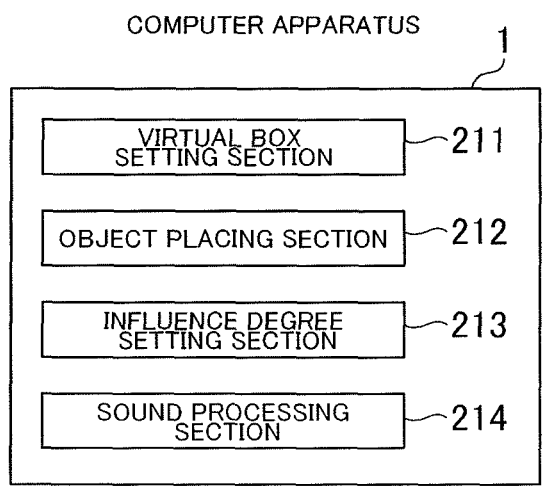
FIG. 13 is a block diagram showing a configuration of a computer apparatus corresponding to at least one of embodiments of the invention.

Next, an outline of a fifth embodiment of the invention will be described. FIG. 13 is a block diagram showing a configuration of a computer apparatus corresponding to at least one of embodiments of the invention. A computer apparatus 1 includes at least a virtual box setting section 211, an object placing section 212, an influence degree setting section 213, and a sound processing section 214.

The virtual box setting 211 has a function of setting plural rectangular parallelepiped virtual boxes that have the same shapes and sizes and are respectively aligned in three axial directions orthogonal to each other, in a predetermined region having at least a rectangular parallelepiped shape in a virtual space. The object placing section 212 has a function of placing an object having the same shape and size as those of the virtual box so as to overlap the shape of the virtual box in at least a part of the plural virtual boxes.

The influence degree setting section 213 has a function of setting, before a straight line that extends from a sound source intersects a placed object, a baseline influence degree which is a baseline as an influence degree due to the sound source with respect to a first virtual box that can be intersected by the straight line, and setting an influence degree of a second virtual box other than the first virtual box based on the baseline influence degree set with respect to the first virtual box. The sound processing section 214 has a function of executing a sound processing process in the virtual space based on the set influence degree.

Figure 14:
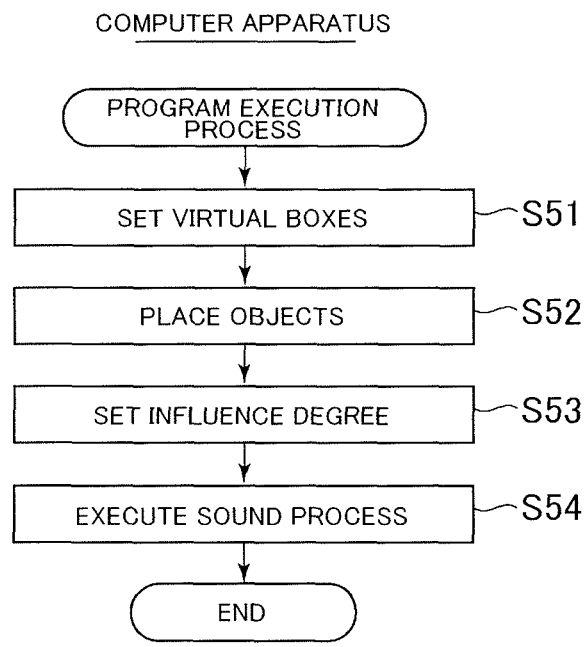
FIG. 14 is a flowchart of a program execution process corresponding to at least one of embodiments of the invention.

A program execution process in the fifth embodiment of the invention will be described. FIG. 14 is a flowchart of a program execution process corresponding to at least one of embodiments of the invention.

The computer apparatus 1 sets plural rectangular parallelepiped virtual boxes that have the same shapes and sizes and are respectively aligned in three axial directions orthogonal to each other, in a predetermined region having at least a rectangular parallelepiped shape in a virtual space (step S51). The computer apparatus 1 places an object having the same shape and size as those of the virtual box so as to overlap the shape of the virtual box in at least a part of the set plural virtual boxes (step S52).

Before a straight line that extends from a sound source intersects a placed object, a baseline influence degree which is a baseline as an influence degree due to the sound source is set with respect to a first virtual box that can be intersected by the straight line, and an influence degree of a second virtual box other than the first virtual box is set based on the baseline influence degree set with respect to the first virtual box (step S53). A sound processing process in the virtual space is executed based on the set influence degree (step S54), and then, the procedure is terminated.

As an aspect of the fifth embodiment, by setting an influence degree to a virtual box and performing a sound processing process based on the set influence degree, it is possible to reduce a load relating to a simulation process in a virtual space.

In the fifth embodiment, the "computer apparatus", the "virtual space", the "object", and the "first virtual box" are the same as the contents disclosed in the first embodiment, respectively.

In the fifth embodiment, the "sound source" refers to a source that produces sound, for example. The "sound processing process" refers to a process of producing sound, for example.

Sixth Embodiment

Next, an outline of a sixth embodiment of the invention will be described. A configuration of a computer apparatus in the sixth embodiment may adopt the same configuration as that shown in the block diagram of FIG. 4. Further, a flow of a program execution process in the sixth embodiment may adopt the same configuration as that shown in the flowchart of FIG. 14. In the sixth embodiment of the invention, for example, a program for placing an object in a virtual space and producing sound capable of being heard from a sound source at a predetermined position in the virtual space is used.

First, plural rectangular parallelepiped virtual boxes that have the same shapes and sizes and are respectively aligned in three axial directions orthogonal to each other are set in a predetermined region having a rectangular parallelepiped shape in a virtual space (step S51).

Then, an object having the same shape and size as those of the virtual box is placed so as to overlap the shape of the virtual box in at least a part of the plural virtual boxes (step S52). The object may have at least one or more attributes. Setting of the virtual boxes and placement of the objects may adopt the same concept as described in FIG. 6.

Subsequently, an influence degree setting process of setting an influence degree due to a sound source installed in a virtual space is performed in consideration of the object placed in step S52 with respect to the virtual box set in step S51 (step S53).

The influence degree setting process may adopt the same concept as described in the flowchart of FIG. 7. That is, before a straight line that extends from the sound source intersects a placed object, an influence degree due to the sound source is set with respect to a first virtual box that can be intersected by the straight line, and an influence degree of a virtual box other than the first virtual box is set based on the influence degree set with respect to the first virtual box.

Here, since, differently from light, sound has traits of colliding with an obstacle to generate echo and avoiding and going around the obstacle, it is not essential that setting of an influence degree is performed according to a distance. That is, the setting of the influence degree may be performed using a theory relating to acoustic engineering.

Finally, a sound processing process relating to a sound source is executed based on the set influence degree (step S54). Although not shown, in the sound processing process, tone quality (waveform), size (amplitude), sound tone (frequency), and the like of sound emitted from a sound source may be set according to the influence degree set with respect to the virtual box, similar to the drawing process shown in FIG. 10.

In the sixth embodiment, the above-described influence degree setting method is exemplary, and an algorithm used for calculation of the influence degree is not limited. For example, an A* (A-star) algorithm may be used, or other graphics search algorithms may be used.

In the sixth embodiment, the sound source is not limited to one point, and plural sound sources may be used. In a case where plural influence degrees are calculated with respect to a virtual box, any one influence degree may be selected, or plural influence degrees may be independently set so that both sounds can be heard. Further, in the case of the same kinds of sounds, the sounds may be amplified or resonated, or may be attenuated.

In the sixth embodiment, the above-described method may be applied with respect to a simulation in a virtual space. Particularly, the method is useful in a case where it is necessary to perform a process in real time and in a seamless manner, in a game in which objects can be freely placed or removed according to a player's operation instruction, such as a sandbox type game.

As an aspect of the sixth embodiment, by setting an influence degree with respect to a virtual box and performing a sound processing process based on the set influence degree, it is possible to reduce a load relating to a simulation process in a virtual space.

In the sixth embodiment, the "computer apparatus", the "virtual space", the "object", and the "first virtual box" are the same as the contents disclosed in the first embodiment, respectively.

In the sixth embodiment, the "sound source" and the "sound processing process" are the same as the contents disclosed in the fifth embodiment, respectively.

Seventh Embodiment

Figure 15:
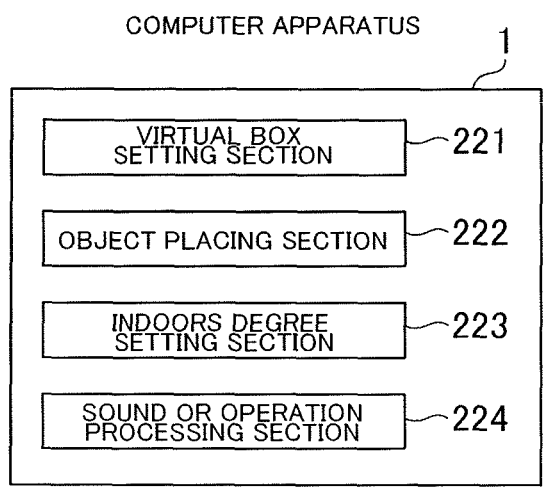
FIG. 15 is a block diagram showing a configuration of a computer apparatus corresponding to at least one of embodiments of the invention.

Next, an outline of a seventh embodiment of the invention will be described. FIG. 15 is a block diagram showing a configuration of a computer apparatus corresponding to at least one of embodiments of the invention. A computer apparatus 1 includes at least a virtual box setting section 221, an object placing section 222, an indoors degree setting section 223, and a sound or operation processing section 224.

The virtual box setting section 221 has a function of setting plural rectangular parallelepiped virtual boxes that have the same shapes and sizes and are respectively aligned in three axial directions orthogonal to each other, in a predetermined region having at least a rectangular parallelepiped shape in a virtual space. The object placing section 222 has a function of placing an object having the same shape and size as those of the virtual box so as to overlap the shape of the virtual box in at least a part of the plural virtual boxes.

The indoors degree setting section 223 has a function of setting, before a straight line that extends from a predetermined point in a virtual space intersects a placed object, an indoors degree indicating the degree of whether a space formed by a placed object is indoors or outdoors with respect to a first virtual box that can be intersected, and setting an indoors degree of a virtual box other than the first virtual box based on the indoors degree set with respect to the first virtual box.

The sound or operation processing section 224 has a function of executing a sound processing process relating to a predetermined sound source or an operation process of a predetermined object in a virtual space based on the set indoors degree.

Figure 16:
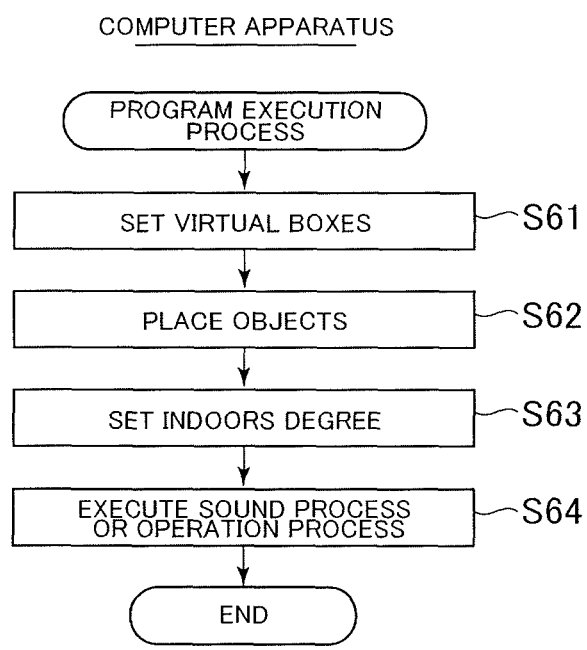
FIG. 16 is a flowchart of a program execution process corresponding to at least one of embodiments of the invention.

A program execution process in the seventh embodiment of the invention will be described. FIG. 16 is a flowchart of a program execution process corresponding to at least one of embodiments of the invention.

The computer apparatus 1 sets plural rectangular parallelepiped virtual boxes that have the same shapes and sizes and are respectively aligned in three axial directions orthogonal to each other, in a predetermined region having at least a rectangular parallelepiped shape in a virtual space (step S61). The computer apparatus 1 places an object having the same shape and size as those of the virtual box so as to overlap the shape of the virtual box in at least a part of the set plural virtual boxes (step S62).

Before a straight line that extends from a predetermined point in a virtual space intersects a placed object, an indoors degree indicating the degree of whether a space formed by the placed object is indoors or outdoors is set with respect to a first virtual box that can be intersected by the straight line, and an indoors degree of a virtual box other than the first virtual box is set based on the indoors degree set with respect to the first virtual box (step S63). Further, a sound processing process relating to a predetermined sound source or an operation process of a predetermined object in a virtual space is executed (step S64) based on the set indoors degree, and then, the procedure is terminated.

As an aspect of the seventh embodiment, by setting an indoors degree with respect to a virtual box and executing a sound processing process relating to a predetermined sound source or an operation process of a predetermined object in a virtual space based on the set indoors degree, it is possible to reduce a load relating to a simulation process in a virtual space.

In the seventh embodiment, the "computer apparatus", the "virtual space", the "object", and the "first virtual box" are the same as the contents disclosed in the first embodiment, respectively.

In the seventh embodiment, the "sound source" and the "sound processing process" are the same as the contents disclosed in the fifth embodiment, respectively.

In the seventh embodiment, the "indoors degree" represents the degree of whether a space formed by a placed object is indoors or outdoors, for example.

Eighth Embodiment

Next, an outline of an eighth embodiment of the invention will be described. A configuration of a computer apparatus in the eighth embodiment may adopt the same configuration as that shown in the block diagram of FIG. 4. A flow of a program execution process in the eighth embodiment may adopt the same configuration as that shown in the flowchart of FIG. 16. In the eighth embodiment, for example, a program for placing an object in a virtual space and executing a sound processing process relating to a sound source or an operation process of a predetermined object in a virtual space based on an indoors degree indicating the degree of whether the virtual space is indoors or outdoors may be used.

First, plural rectangular parallelepiped virtual boxes that have the same shapes and sizes and are respectively aligned in three axial directions orthogonal to each other are set in a predetermined region having a rectangular parallelepiped shape in a virtual space (step S61).

Then, an object having the same shape and size as those of the virtual box so as to overlap the shape of the virtual box is placed in at least a part of the plural virtual boxes (step S62). The object may have at least one or more attributes. Setting of the virtual boxes and placement of the objects may adopt the same concept as described in FIGS. 6A and 6B.

Subsequently, an indoors degree setting process of setting an indoors degree indicating the degree of whether a space formed by the object placed in step S62 is indoors or outdoors with respect to the virtual box set in step S61 is performed (step S63).

The indoors degree setting process may adopt the same concept as described in the flowchart of FIG. 7. That is, before a straight line that extends from a predetermined point (in which the predetermined point is a concept including infinity) in a virtual space intersects a placed object, an indoors degree indicating the degree of whether a space formed by the placed object is indoors or outdoors is set with respect to a first virtual box that can be intersected by the straight line, and an indoors degree of a virtual box other than the first virtual box is set based on the indoors degree set with respect to the first virtual box.

Here, since, differently from light, sound has traits of colliding with an obstacle to generate echo and avoiding and going around the obstacle, the setting of the indoors degree may be independently performed for each element. For example, in the case of sound, it is not essential that setting of an indoors degree is performed according to a distance. That is, the setting of the indoors degree may be performed using a theory relating to acoustic engineering. Further, in the case of wind, similarly, it is not essential that setting of an indoors degree is performed according to a distance. That is, the setting of the indoors degree may be performed using a theory relating to hydrodynamics.

Finally, a sound processing process relating to a predetermined sound source or an operation process of a predetermined object in a virtual space is executed based on the set indoors degree (step S64), and the procedure is terminated.

Here, the sound processing process relating to the predetermined sound source will be described. The predetermined sound source represents a material that produces sound in a predetermined space in a virtual space, for example. In a case where the predetermined space is outdoors, a manner in which sound is heard is not changed, but in a case where the predetermined space is indoors, sound collides with a placed object, and the object vibrates itself. Further, voice is generated again due to the vibration of the object, which generates echo. In this way, the sound processing process in the eighth embodiment is a process for more realistically expressing a situation where there is a change in a manner in which sound is heard according to a difference between indoors and outdoors, and for example, is a process for expressing echo of indoors sound.

Next, the operation process of the predetermined object in the virtual space will be described. In a case where the predetermined space is outdoors, for example, an object may shake due to the influence of wind. On the other hand, in a case where the predetermined space is indoors, since there is no influence of wind, an operation of an object does not vary. In this way, the operation process of the predetermined object in the virtual space according to the eighth embodiment is a process of more realistically expressing a situation where there is a change in the operation of the object due to a difference between indoors and outdoors, and for example, corresponds to a drawing process in consideration of the influence of outdoor wind.

In the eighth embodiment, the above-described indoors degree setting method is exemplary, and an algorithm used for calculation of the indoors degrees is not limited. For example, an A*algorithm may be used, or other graph search algorithms may be used.

In the eighth embodiment, the sound source is not limited to one point, and plural sound sources may be provided. In a case where plural influence degrees are calculated with respect to a virtual box, any one influence degree may be selected, or plural influence degrees may be independently set so that both sounds can be heard. Further, in the case of the same kinds of sounds, the sounds may be amplified or resonated, or may be attenuated.

In the eighth embodiment, the above-described method may be applied to a simulation in a virtual space. Particularly, the method is useful in a case where it is necessary to perform a process in real time and in a seamless manner, in a game in which objects can be freely placed or removed according to a player's operation instruction, such as a sandbox type game.

As an aspect of the eighth embodiment, by setting an indoors degree to a virtual box and executing a sound processing process relating to a predetermined sound source or an operation process of a predetermined object in a virtual space based on the set indoors degree, it is possible to reduce a load relating to a simulation process in a virtual space without performing a complicated shading process or a computational process relating to sound.

As an aspect of the eighth embodiment, by setting an indoors degree to a virtual box and executing a sound processing process relating to a predetermined sound source or an operation process of a predetermined object in a virtual space based on the set indoors degree, it is possible to distinguish between a process executed only outdoors and a process executed only indoors, and to express more realistic graphics and sound.

In the eighth embodiment, the "computer apparatus", the "virtual space", the "object", and the "first virtual box" are the same as the contents disclosed in the first embodiment, respectively.

In the eighth embodiment, the "predetermined point in the virtual space" may be any point as long as it is included in a space defined as outdoors, for example. The "indoors" represents the inside of a building, the inside of a cave, the inside of a forest, or the like, for example, and is an attribute of a space that can be defined according to space setting. The "outdoors" refers to a space on a virtual space, which is a space other than indoors, for example.

In the eighth embodiment, the "sound source" and the "sound processing process" are the same as the contents disclosed in the fifth embodiment, respectively.

In the eighth embodiment, the "object operation process" refers to a process of operating an object with an outside force, which includes a drawing process, for example.

APPENDIX

The above-described embodiments are disclosed so that those skilled in the art can perform the following inventions.

[1] A drawing processing program executed in a computer apparatus that causes the computer apparatus to function as:

a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space;

an object placer that places an object having the same shape and size as those of each virtual box so as to overlap the shape of the virtual box in at least a part of the plurality of virtual boxes;

an influence degree setter that sets, before a straight line that extends from a light source intersects the placed object, a baseline influence degree which is a baseline as an influence degree due to the light source with respect to a first virtual box that can be intersected by the straight line, and sets an influence degree of a second virtual box other than the first virtual box based on the baseline influence degree set with respect to the first virtual box; and a drawing processor that executes a drawing process in the virtual space based on the set influence degree.

[2] The drawing processing program according to [1], wherein the influence degree setter sets an influence degree due to the light source with respect to a second virtual box adjacent to the first virtual box based on the baseline influence degree set with respect to the first virtual box, sets an influence degree due to the light source with respect to a second virtual box for which an influence degree is not yet set, which is adjacent to the second virtual box for which the influence degree is set, based on the influence degree set with respect to the second virtual box, and repeatedly executes setting of an influence degree with respect to a second virtual box for which an influence degree is not yet set, which is adjacent to the second virtual box for which the influence degree is set.

[3] The drawing processing program according to [2], wherein in a case where the influence degree setter repeatedly executes the setting of the influence degree with respect to the second virtual box for which the influence degree is not yet set, which is adjacent to the second virtual box for which the influence degree is set, and in a case where different influence degrees are calculated with respect to the same virtual box, the influence degree setter sets a value closer to the baseline influence degree as the influence degree.

[4] The drawing processing program according to any one of [1] to [3], causing the computer apparatus to further function as:

an object display mode identifier that identifies, with respect to the placed object, a display mode of a face which is not in contact with a different object according to an influence degree of a virtual box set at a position that is in contact with the face which is not in contact with the different object, wherein the drawing processor executes the drawing process in the virtual space according to the identified display mode of the object.

[5] The drawing processing program according to [4], causing the computer apparatus to further function as:

an object display mode storage that stores a texture which is the display mode of the face which is not in contact with the different object in association with an influence degree of a virtual box, wherein the drawing processor executes the drawing process in the virtual space by attaching a texture according to an influence degree of a virtual box to face which is not in contact with the different object, with respect to a placed object.

[6] The drawing processing program according to [5], wherein the object display mode storage stores the texture in association with the influence degree so that as the influence degree becomes a value more different from the baseline influence degree, the texture has a mode more different from a texture corresponding to the baseline influence degree.

[7] A drawing processing apparatus including:
a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space;
an object placer that places an object having the same shape and size as those of each virtual box so as to overlap the shape of the virtual box in at least a part of the plurality of virtual boxes;
an influence degree setter that sets, before a straight line that extends from a light source intersects the placed object, a baseline influence degree which is a baseline as an influence degree due to the light source with respect to a first virtual box that can be intersected by the straight line, and sets an influence degree of a second virtual box other than the first virtual box based on the baseline influence degree set with respect to the first virtual box; and
a drawing processor that executes a drawing process in the virtual space based on the set influence degree.

[8] A drawing processing method executed in a computer apparatus, including:
a step of setting a plurality of rectangular parallelepiped virtual boxes that have the same shapes and sizes and are respectively aligned in three axial directions orthogonal to each other, in a predetermined region having at least a rectangular parallelepiped shape in a virtual space;
a step of placing an object having the same shape and size as those of each virtual box so as to overlap the shape of the virtual box in at least a part of the plurality of virtual boxes;
a step of setting, before a straight line that extends from a light source intersects the placed object, a baseline influence degree which is a baseline as an influence degree due to the light source with respect to a first virtual box that can be intersected by the straight line, and setting an influence degree of a second virtual box other than the first virtual box based on the baseline influence degree set with respect to the first virtual box; and
a step of executing a drawing process in the virtual space based on the set influence degree.

[9] A sound processing program executed in a computer apparatus that causes the computer apparatus to function as:
a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space;
an object placer that places an object having the same shape and size as those of each virtual box so as to overlap the shape of the virtual box in at least a part of the plurality of virtual boxes;
an influence degree setter that sets, before a straight line that extends from a sound source intersects the placed object, an influence degree due to the sound source with respect to a first virtual box that can be intersected by the straight line, and sets an influence degree of a virtual box other than the first virtual box based on the influence degree set with respect to the first virtual box; and
a sound processor that executes a sound processing process relating to the sound source based on the set influence degree.

[10] A sound processing apparatus including:
a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space;
an object placer that places an object having the same shape and size as those of each virtual box so as to overlap the shape of the virtual box in at least a part of the plurality of virtual boxes;
an influence degree setter that sets, before a straight line that extends from a sound source intersects the placed object, an influence degree due to the sound source with respect to a first virtual box that can be intersected by the straight line, and sets an influence degree of a virtual box other than the first virtual box based on the influence degree set with respect to the first virtual box; and
a sound processor that executes a sound processing process relating to the sound source based on the set influence degree.

[11] A sound processing method executed in a computer apparatus, including:
a step of setting a plurality of rectangular parallelepiped virtual boxes that have the same shapes and sizes and are respectively aligned in three axial directions orthogonal to each other, in a predetermined region having at least a rectangular parallelepiped shape in a virtual space;
a step of placing an object having the same shape and size as those of each virtual box so as to overlap the shape of the virtual box in at least a part of the plurality of virtual boxes;
a step of setting, before a straight line that extends from a sound source intersects the placed object, an influence degree due to the sound source with respect to a first virtual box that can be intersected by the straight line, and setting an influence degree of a virtual box other than the first virtual box based on the influence degree set with respect to the first virtual box; and
a step of executing a sound processing process relating to the sound source based on the set influence degree.

[12] A sound processing program executed in a computer apparatus that causes the computer apparatus to function as:
a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space;
an object placer that places an object having the same shape and size as those of each virtual box so as to overlap the shape of the virtual box in at least a part of the plurality of virtual boxes;
an indoors degree setter that sets, before a straight line that extends from a predetermined point in the virtual space intersects the placed object, an indoors degree indicating the degree of whether a space formed by the placed object is indoors or outdoors with respect to a first virtual box that can be intersected by the straight line, and sets an indoors degree of a virtual box other than the first virtual box based on the indoors degree set with respect to the first virtual box;
and a processor that executes a sound processing process relating to a predetermined sound source or an operation process of a predetermined object in the virtual space based on the set indoors degree.

[13] A sound processing apparatus including:
a virtual box setter that sets a plurality of rectangular parallelepiped virtual boxes that have the same shapes and sizes and are respectively aligned in three axial directions orthogonal to each other, in a predetermined region having at least a rectangular parallelepiped shape in a virtual space;
an object placer that places an object having the same shape and size as those of each virtual box so as to overlap the shape of the virtual box in at least a part of the plurality of virtual boxes;
an indoors degree setter that sets, before a straight line that extends from a predetermined point in the virtual space intersects the placed object, an indoors degree indicating the degree of whether a space formed by the placed object is indoors or outdoors with respect to a first virtual box that can be intersected by the straight line, and sets an indoors degree of a virtual box other than the first virtual box based on the indoors degree set with respect to the first virtual box; and
a processor that executes a sound processing process relating to a predetermined sound source or an operation process of a predetermined object in the virtual space based on the set indoors degree.

[14] A sound processing method executed in a computer apparatus, including:
a step of setting a plurality of rectangular parallelepiped virtual boxes that have the same shapes and sizes and are respectively aligned in three axial directions orthogonal to each other, in a predetermined region having at least a rectangular parallelepiped shape in a virtual space;
a step of placing an object having the same shape and size as those of each virtual box so as to overlap the shape of the virtual box in at least a part of the plurality of virtual boxes;
a step of setting, before a straight line that extends from a predetermined point in the virtual space intersects the placed object, an indoors degree indicating the degree of whether a space formed by the placed object is indoors or outdoors with respect to a first virtual box that can be intersected by the straight line, and setting an indoors degree of a virtual box other than the first virtual box based on the indoors degree set with respect to the first virtual box; and
a step of executing a sound processing process relating to a predetermined sound source or an operation process of a predetermined object in the virtual space based on the set indoors degree.

The invention claimed is:

1. A non-transitory computer-readable recording medium having recorded thereon a program which is executed in a computer apparatus that causes the computer apparatus to:
set a plurality of rectangular parallelepiped virtual boxes that have the same shapes and sizes and are respectively aligned in three axial directions orthogonal to each other, in a predetermined region having at least a rectangular parallelepiped shape in a virtual space;
place an object having a same shape and size as each virtual box so as to overlap a shape of a virtual box in at least a part of the plurality of rectangular parallelepiped virtual boxes;
set, before a straight line that extends from a light source intersects the placed object, a baseline influence degree which is a baseline as an influence degree due to the light source with respect to a first virtual box that can be intersected by the straight line, and set an influence degree of a second virtual box other than the first virtual box based on the baseline influence degree set with respect to the first virtual box;
identify, with respect to the placed object, a display mode of a face which is not in contact with a different object according to an influence degree of a virtual box set at a position that is in contact with the face which is not in contact with the different object; and
execute a drawing process in the virtual space based on the set influence degree and according to the identified display mode of the object.

2. The non-transitory computer-readable recording medium for drawing processing according to claim 1, wherein
an influence degree is set due to the light source with respect to a second virtual box adjacent to the first virtual box based on the baseline influence degree set with respect to the first virtual box,
an influence degree is set due to the light source with respect to a third virtual box for which an influence degree is not yet set, which is adjacent to the second virtual box for which the influence degree is set, based on the influence degree set with respect to the second virtual box, and
an influence degree with respect to a fourth virtual box for which an influence degree is not yet set, which is adjacent to the third virtual box for which the influence degree is set, is repeatedly set.

3. The non-transitory computer-readable recording medium for drawing processing according to claim 2, wherein in a case where the influence degree with respect to the fourth virtual box for which the influence degree is not yet set, which is adjacent to the third virtual box for which the influence degree is set, is repeatedly set and in a case where different influence degrees are calculated with respect to a same virtual box, a value closer to the baseline influence degree is set as the influence degree.

4. The non-transitory computer-readable recording medium for drawing processing according to claim 1, causing the computer apparatus to further:
store a texture which is the display mode of the face which is not in contact with the different object in association with the influence degree of the virtual box,
wherein the drawing process is executed in the virtual space by attaching a texture according to the influence degree of the virtual box to the face which is not in contact with the different object, with respect to the placed object.

5. The non-transitory computer-readable recording medium for drawing processing according to claim 4, wherein the texture is stored in association with the influence degree so that as the influence degree becomes a value more different from the baseline influence degree, the texture has a mode more different from a texture corresponding to the baseline influence degree.

6. A drawing processing apparatus comprising:
a processor; and
a memory including a set of executable instructions that, when executed by the processor, cause the processor to perform operations including:
setting a plurality of rectangular parallelepiped virtual boxes that have same shapes and sizes and are respectively aligned in three axial directions orthogonal to each other, in a predetermined region having at least a rectangular parallelepiped shape in a virtual space;
placing an object having a same shape and size as each virtual box so as to overlap a shape of a virtual box in at least a part of the plurality of rectangular parallelepiped virtual boxes;

setting, before a straight line that extends from a light source intersects the placed object, a baseline influence degree which is a baseline as an influence degree due to the light source with respect to a first virtual box that can be intersected by the straight line, and setting an influence degree of a second virtual box other than the first virtual box based on the baseline influence degree set with respect to the first virtual box;

identifying, with respect to the placed object, a display mode of a face which is not in contact with a different object according to an influence degree of a virtual box set at a position that is in contact with the face which is not in contact with the different object; and executing a drawing process in the virtual space based on the set influence degree and according to the identified display mode of the object.

7. A drawing processing method executed in a computer apparatus, the drawing processing method comprising:

setting a plurality of rectangular parallelepiped virtual boxes that have same shapes and sizes and are respectively aligned in three axial directions orthogonal to each other, in a predetermined region having at least a rectangular parallelepiped shape in a virtual space;

placing an object having a same shape and size as each virtual box so as to overlap a shape of a virtual box in at least a part of the plurality of rectangular parallelepiped virtual boxes;

setting, before a straight line that extends from a light source intersects the placed object, a baseline influence degree which is a baseline as an influence degree due to the light source with respect to a first virtual box that can be intersected by the straight line, and setting an influence degree of a second virtual box other than the first virtual box based on the baseline influence degree set with respect to the first virtual box;

identifying, with respect to the placed object, a display mode of a face which is not in contact with a different object according to an influence degree of a virtual box set at a position that is in contact with the face which is not in contact with the different object; and executing a drawing process in the virtual space based on the set influence degree and according to the identified display mode of the object.

* * * * *